United States Patent [19]

Palmer

[11] Patent Number: 5,353,601
[45] Date of Patent: Oct. 11, 1994

[54] STRUCTURAL COOLING SYSTEMS AND METHODS

[76] Inventor: Gerald R. Palmer, 7162 E. Stetson Dr., Scottsdale, Ariz. 85251

[21] Appl. No.: 18,044

[22] Filed: Feb. 16, 1993

[51] Int. Cl.⁵ .............................................. F25D 17/08
[52] U.S. Cl. ........................................ 62/171; 62/309; 62/314; 62/259.4; 62/262
[58] Field of Search ................. 62/171, 121, 309, 310, 62/304, 314, 176.4, 262, 259.1, 259.4

[56] References Cited

U.S. PATENT DOCUMENTS

| | | | |
|---|---|---|---|
| 1,749,343 | 3/1930 | Hersh . | |
| 1,808,829 | 6/1931 | Barnes . | |
| 2,118,949 | 5/1938 | Scott | 62/171 |
| 2,637,181 | 5/1953 | Schramm | 62/314 X |
| 3,604,218 | 9/1971 | Cresti | 62/408 |
| 3,747,362 | 7/1973 | Mercer | 62/171 |
| 3,945,432 | 3/1976 | Tamblyn | 165/22 |
| 3,964,268 | 6/1976 | DiPeri | 62/121 |
| 4,066,118 | 1/1978 | Goettl | 165/18 |
| 4,176,587 | 12/1979 | Cox | 62/314 X |
| 4,178,764 | 12/1979 | Rowe | 62/176.4 X |
| 4,351,163 | 9/1982 | Johannsen | 62/314 X |
| 4,572,428 | 2/1986 | Groff et al. | 236/44 A |
| 4,761,965 | 8/1988 | Viner | 62/171 |
| 4,879,075 | 11/1989 | Hinton | 261/26 |
| 4,899,645 | 2/1990 | Wolfe et al. | 454/200 X |
| 4,905,479 | 3/1990 | Wilkinson | 62/271 |
| 4,932,218 | 6/1990 | Robbins | 62/171 |
| 4,951,480 | 8/1990 | Brence | 62/314 X |
| 5,022,241 | 6/1991 | Wilkinson | 62/271 |
| 5,117,811 | 6/1992 | Taylor | 126/623 |
| 5,146,762 | 9/1992 | Atkins | 62/171 |

*Primary Examiner*—Harry B. Tanner
*Attorney, Agent, or Firm*—Steven G. Lisa; Peter C. Warner

[57] ABSTRACT

A structural cooling system is disclosed, which includes an evaporative cooler suitable for cooling a body of air in an upper, enclosed chamber of a structure, such as an attic, and a series of vents or ducts, particularly around the perimeter of the building, for applying the cooled air selectively to high heat-gain portions of the exterior of the structure. An interior cooling system, which may include an air-conditioning unit, is suitable for cooling the interior of the building, but will require only reduced capacity, because of the cooling effect on the structure's exterior.

20 Claims, 3 Drawing Sheets

STRUCTURAL COOLING SYSTEMS AND METHODS

BACKGROUND OF THE INVENTION

The invention is in the field of systems for altering the temperature of structures such as houses or commercial buildings, particularly for cooling human-occupied structures.

Standard home or commercial interior cooling systems rely heavily on air-conditioning units. In some areas of the country, evaporative coolers have become popular. The primary advantage of evaporative cooling is that it operates at significantly lower power than air-conditioning systems, but the primary disadvantage is that it is suitable for use only in dry (non-humid) weather. Thus, it is now common for evaporative cooling systems to have an air-conditioning backup. However, such dual systems are often expensive, because each "half" of the system must have the capacity to cool the entire structure without assistance from the other component.

In addition, a great deal of the cooling power of standard interior cooling systems is wasted by offsetting heat infiltration across particular areas of the structure that allow a high thermal gradient, such as windows, doors, and skylights. Thus, much of the cooling power of standard systems is wasted.

One prior art system, disclosed in U.S. Pat. No. 3,964,268, issued Jun. 22, 1976, to DiPeri, discloses an evaporative-cooling system that solves some, but not all, of the above-described problems. DiPeri discloses an evaporative cooler with two sets of ducts, one for cooling the interior of the structure and the other for flowing evaporatively cooled air along the exterior surface of the roof, to reduce the infiltration of heat from solar energy impinging on that surface. However, the DiPeri system does not apply the exterior air selectively, and so the amount of exterior cooling required to reduce heat infiltration is quite high. Thus, DiPeri-type systems excessively cool the outside air and therefore still require a large expenditure of total energy. Other systems apply evaporative cooling to spaces outside and adjacent to the structure, but such systems also do not apply the exterior cooling selectively.

SUMMARY OF THE INVENTION

It is an object of the invention, therefore, to provide new and improved systems and methods for altering the temperature of structures more energy-efficiently.

It is another object of the invention to provide new and improved systems and methods for cooling residences or commercial buildings.

It is another object of the invention to provide new and improved systems and methods for cooling human-occupied structures.

It is another object of the invention to provide new and improved systems and methods for heating structures more energy-efficiently.

It is another object of the invention to provide new and improved systems and methods for using evaporative cooling, which is more energy-efficient, to assist air-conditioning equipment, with lower overall equipment costs.

It is another object of the invention to provide new and improved systems and methods for blocking or reducing heat infiltration across high heat-gain areas, such as windows, doors, and skylights, without unduly burdening the cooling system.

It is another object of the invention to provide new and improved systems and methods for selectively applying cooled air to block heat infiltration.

It is another object of the invention to provide new and improved systems and methods including the advantageous use of cooled air contained in an upper enclosed chamber of a structure.

It is another object of the invention to provide new and improved systems and methods for using powered fans, preferably solar-powered, to improve the efficiency of evaporative cooling systems.

It is another object of the invention to provide new and improved systems and methods for improving the efficiency of air-conditioning compressors.

It is another object of the invention to provide new and improved systems and methods for selectively applying cooled air for work or recreational uses.

It is another object of the invention to provide new and improved systems and methods for sensing conditions of high heat infiltration and automatically applying cooled air to block such infiltration.

It is another object of the invention to provide new and improved systems and methods for sensing temperature and humidity and applying such information to control a cooling system for a structure to maximize its efficiency.

The above and other objects of the invention are achieved in the disclosed embodiments through a structural cooling system that includes an evaporative cooler suitable for cooling a body of air in an upper, enclosed chamber of a structure, such as an attic, and a series of vents or ducts, particularly around the perimeter of the building, for applying the cooled air selectively to high heat-gain portions of the exterior of the structure. Another interior cooling element, which may include an air-conditioning unit, is suitable for cooling the interior of the building, but will require reduced capacity or usage, because of the cooling effect on the structure's exterior.

In one extension of the invention, fans, preferably using solar power, are placed through the roof into the upper enclosed chamber of the structure containing the cooled body of air. The fans are used to pull air from outside through the evaporative cooler, reducing the power required to operate that unit.

Any subset of the following set of options for applying the body of air cooled by the evaporative cooler can be implemented: (a) vents can be placed directly above exterior windows to permit a curtain of cooled air to flow from the enclosed chamber across the exterior surface of the windows; (b) skylights can be placed so that the cooled body of air passes through the skylights; (c) one or more vents or ducts can direct a stream of cooled air at the compressor unit of an air-conditioner; (d) a duct can apply the cooled air from the enclosed chamber to semi-enclosed areas such as garages or porches; (e) vents can be placed to provide a curtain of cooled air across doors or entrances; (f) a duct can direct cooled air to areas outside but adjacent to the structure that are used for work or recreation, such as patios or pool areas; or (g) ducts can direct cooled air to the building's interior, allowing application of that cooled air to reduce or replace entirely the level of air-conditioning required to maintain a comfortable environment.

Any of the following set of options for controlling the system can also be selected: (a) temperature or humidity sensors and coupled control equipment can switch ducts leading to the building interior, allowing the system to select automatically the most efficient method or combination of methods of cooling the habited, enclosed areas of the structure; (b) temperature or humidity sensors and coupled control equipment can switch ducts leading to the semi-enclosed areas such as a garage, to maintain those areas at a relatively comfortable temperature at relatively lower cost; (c) a manual switch can permit the occupant to control ducts leading to work or recreational areas; or (d) sensors or motion detectors can detect the opening of a door, or the arrival of a person near a door, permitting the activation of ducts directing cooled air across doors only when the door is opened or about to be opened.

The system of the invention can be modified to operate as a heating system, or a combination heating and cooling system, by providing a heat sink in a portion of the structure for containing a body of heated air, preferably heated with passive solar techniques, which can be applied to exterior portions of the structure susceptible to high heat loss from the structure.

Thus, the inventive system can reduce substantially the quantity of air-conditioning required to cool the interior of a structure to an acceptable level. The controlled and selective application of the created body of cooled air permits more efficient interior cooling without requiring excessive outside cooling.

Other aspects of the invention will be appreciated by those skilled in the art after reviewing the following detailed description of the invention.

BRIEF DESCRIPTION OF THE DRAWINGS

The novel features of the invention are described with particularity in the claims. The invention, together with its objects and advantages, will be better understood after referring to the following description and the accompanying figures. Throughout the figures, a common reference numeral is intended to refer to the same element.

DETAILED DESCRIPTION

Figure 1:
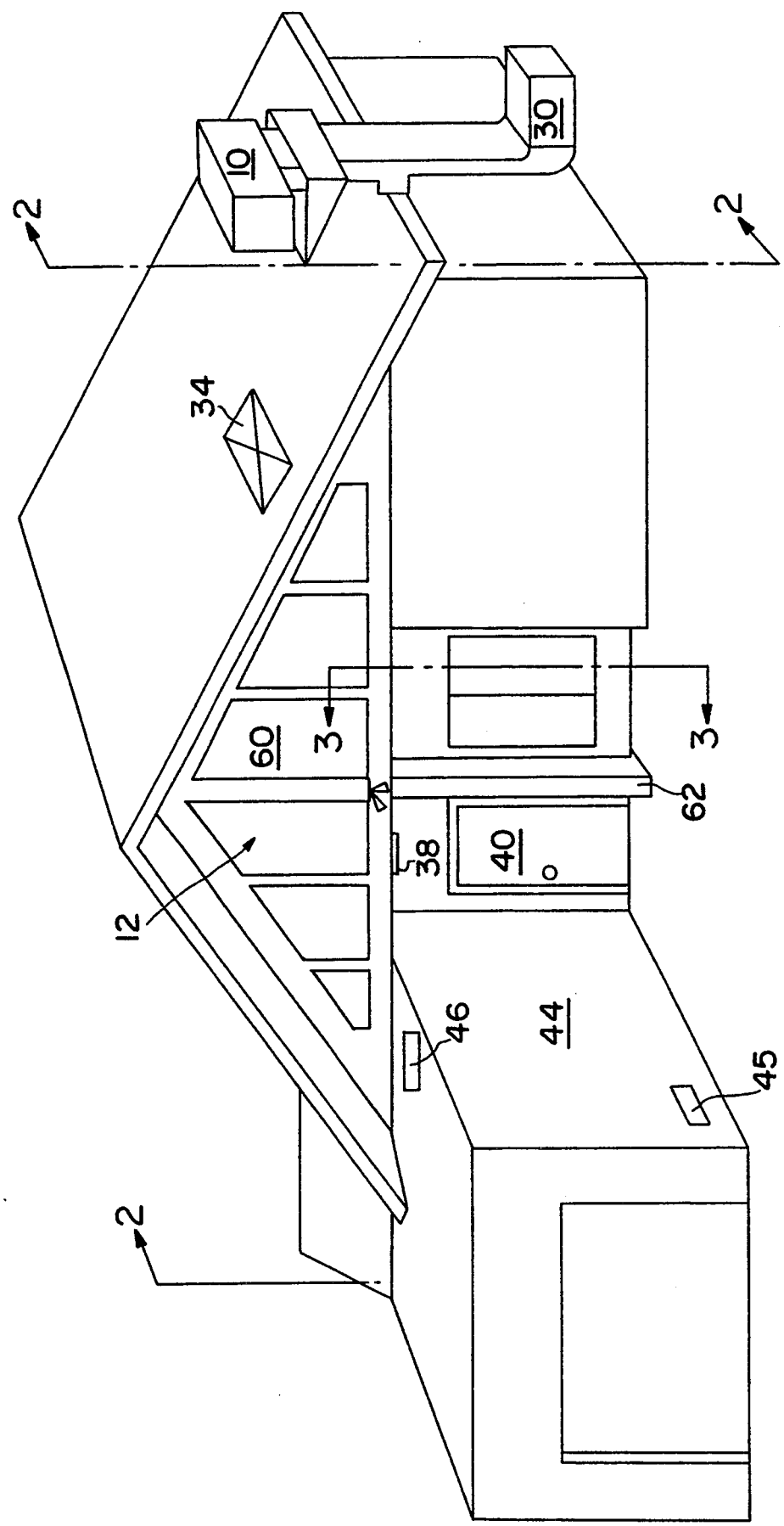
FIG. 1 shows a perspective view of a structure incorporating aspects of a preferred embodiment of the invention.
Figure 2:
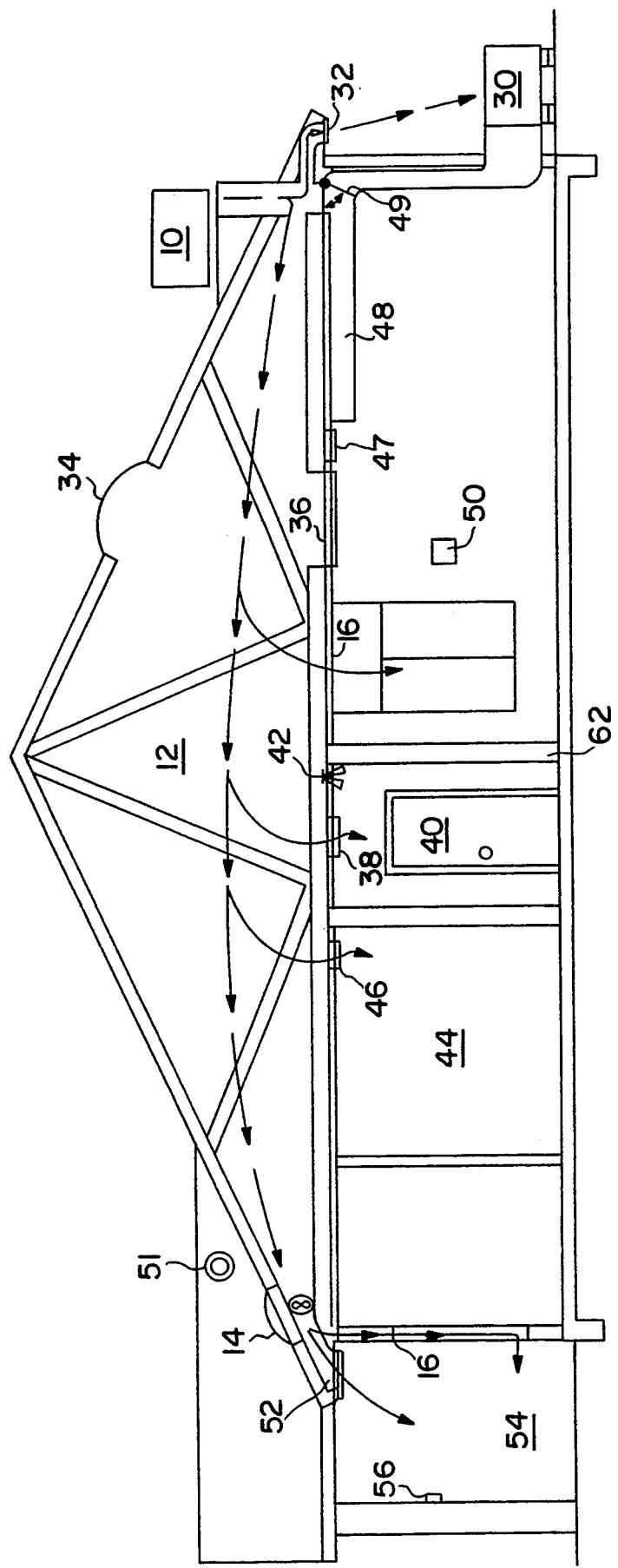
FIG. 2 shows a cross-sectional view of the structure shown in FIG. 1.

FIG. 1 shows a perspective view of a structure incorporating aspects of a preferred embodiment of the invention. FIG. 2 shows a view of the same structure, as would be seen if the front portion of the structure were cut away, as indicated by the 2—2 cut line in the perspective view of FIG. 1. Evaporative-type cooler 10 can be placed on the roof, as shown, or on the ground adjacent to the structure, or mounted on a platform against a dormer on the side of the structure. Cooler 10 can be solar-powered, A.C.-powered, or a combination of the two. Cool, moist air is forced by the blower of cooler 10 into an enclosed chamber of the structure, preferably at or near the top of the structure, such as attic 12 of the structure illustrated in FIGS. 1 and 2. Most residential designs in popular use have a chamber suitable for enclosing the cooled body of air. Pitched roofs with trusses, or parapet designs with trussed roofs (such as Santa Fe or Territorial styles) are examples of suitable designs. In a commercial structure, such as an office building, air from cooler 10 can be held in a utility room or mechanical area, such as frequently exist near the top of such structures, or an area above a drop ceiling, perhaps even on each level.

The passage of air into attic 12 can be assisted by one or more fans 14, which operate to pull in outside air. Fans 14 have both their inlet and outlets inside the attic 12. Because attic 12 omits the typical roof vents, fans 14 pull outside air inside attic 12 through the vent system associated with cooler 10, thereby assisting the blower of cooler 10 and reducing the power required to operate that element. Preferably, fans 14 can be of the variable-speed, photovoltaic-powered type, which allows for increased air intake at the times of greatest need and greatest power consumption.

In hot weather, such evaporatively cooled air as introduced into attic 12 may not be suitable for use directly in the lower, habited interior of the house, either because it is too humid or because it is too hot. However, that air will normally be cooler than the air on the exterior of the structure in such hot weather. In addition, the system will prevent the build up of high temperatures in attic 12. In many houses not equipped with the system of the invention, attic temperatures can reach 65° C. in the hot parts of the summer. One advantage of the invention is that the temperature of the pocket of air in the attic 12 is significantly reduced from a level that can be well above the outside ambient air temperature to a level well below the outside ambient air temperature. That feature not only reduces the energy needed to cool the interior of the structure, but also eliminates or reduces the need for insulation in the floor of attic 12.

In the hot weather, the cool, moist body of air in attic 12 is then applied as a film or curtain of cool air at a number of other areas, including predetermined sections of the perimeter of the structure. Exterior vents 16 near the lower portions of attic 12 at the perimeter of the structure permit the flow of air to be directed from attic 12 downward along the exterior of the structures- Vents 16 are preferably located near sections of the structure that would permit the passage of a great deal of heat into the interior of the structure- One principal area of such high heat-gain is glass windows. Modern building design, both residential and commercial, often emphasizes the use of windows, such as for purposes of increasing lighting and spatial perception. However, the increased use of windows reduces the energy efficiency of the structure, which effect is combated by the system of the invention.

Figure 3:
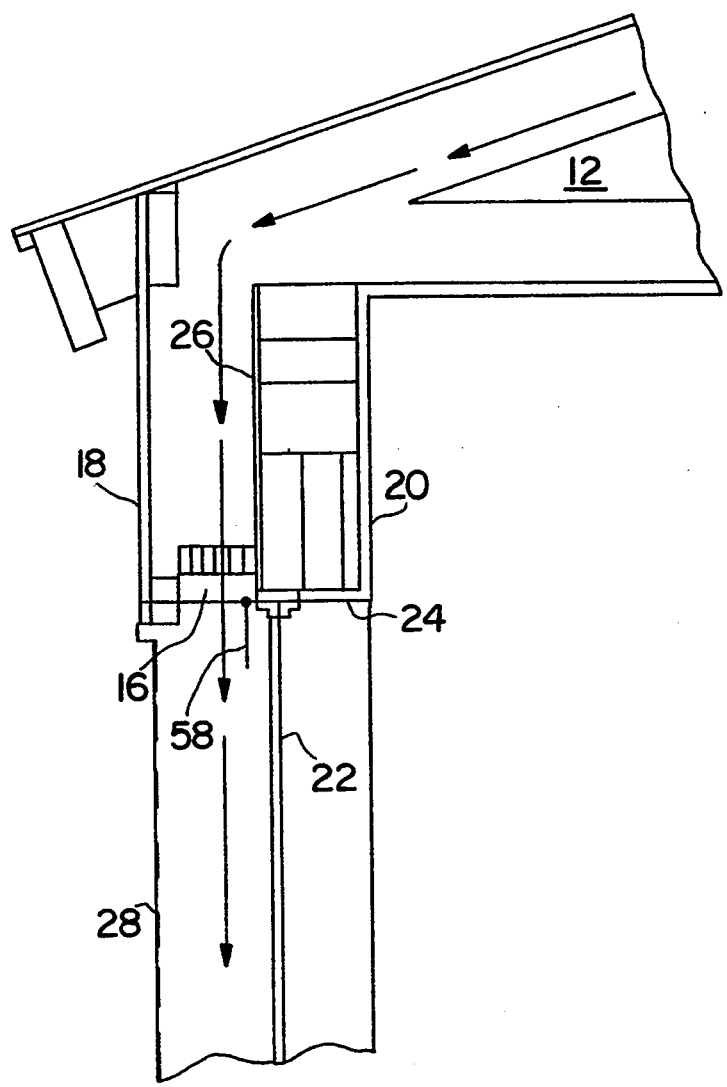
FIG. 3 shows a close-up cross-sectional view of a window portion of the structure shown in FIG. 1.

FIG. 3 illustrates (not to scale) in cross-sectional view one design of the structure surrounding one of vents 16 placed above a window. Exterior surface 18, which may be made of any material, such as siding or stucco, is placed slightly farther than usual from interior wallboard 20. For example, if usual walls are built with 2×4 boards, 2×6 boards may be used instead, so that the exterior wall is placed 6" rather than 4" inches from the interior walls. Window frame 24—made with 2×4s—is placed towards the interior wall of the house, and glass window 22 is attached flush with or near the outside of window frame 24. Because of the greater-than-normal thickness of the exterior wall, there is a gap between window frame 24 and the plane made up by exterior surface 18. Vents 16 are placed directly above that gap.

All places between surfaces 18 and 20 except at the windows can be filled with insulating batts (not shown), as is present industry practice. If desired, portions of the space between surfaces 18 and 20 directly above window frame 24 can also be insulated, and the insulation can be secured in place with board 26 made of wood or sheet metal, permitting a gap for the passage of air between attic 12 and vent 16.

Application of the air across the glass does not restrict views through the window, as does most window heat shielding. If further protection is desired, however, standard heat-resistant techniques can be applied as well, such as placing films on the window glass or adding shade screen 28, shown in FIG. 3 aligned with exterior surface 18. The addition of screen 28 has the added benefit of providing a conduit for the passage of the cooled air, reducing the chance that the air stream will become turbulent before reaching the bottom of the window glass.

As shown by the arrows, in the design of FIG. 3, cooled air passes from attic 12 through the space in the exterior wall above and outside of window frame 24 and continues through vent 16 down along the exterior of window 22. Other modifications can be used in place of the system of FIG. 3. For example, the cooled air can pass between the panes of a dual-pane window, or the outside portion of the window france can be pierced with holes, creating vent 16 and permitting the passage of air along the outside of glass 22 without the need for a thicker exterior wall.

Air-conditioner 30, of standard design, cools the interior of the structure through a standard vent and duct system. However, the inventive system requires less air-conditioning to achieve the same degree of cooling.

For example, on a hot summer's day in a desert environment, the ambient air temperature may exceed 40° C. Therefore, to obtain an interior temperature of 25° C., a conventional air-conditioning system must fight a gradient of at least 15° C. Indeed, as noted above, most attics will heat up above the outside ambient air temperature, making the gradient even larger when averaged across the surface of the structure's interior areas. In the inventive system, by contrast, the exterior "envelope" of air at the high heat gain areas and the air mass in attic 12, mostly surround the interior of the structure with air that is below outside ambient air temperature. The system of FIG. 1 uses evaporative cooler 10 to create a partially cooled body of air, perhaps with a temperature of 32° C., which envelops the structure, permitting air-conditioning system 30 to work against a greatly reduced gradient, 7° C. in this example.

That reduced temperature gradient permits a substantial reduction in the size and power (tonnage) of the air-conditioning unit 30, thereby saving energy. By contrast, most dual evaporative-cooler and air-conditioner systems require each of those elements to have the capacity to cool the entire structure, because only one will typically operate at a time. In addition, because evaporative cooling is substantially more energy efficient than air-conditioning—typically by a factor of four or five times—the overall energy cost required to achieve the desired inside temperature can be lowered. The preferred system can achieve even greater savings, because fans 14 assist cooler 10, as explained above. Even on days that are too humid for a standard evaporative cooler to operate efficiently, the inventive system can reduce the temperature differential that air conditioner 30 must overcome, more than justifying the use of both pieces of equipment simultaneously.

The system provides additional advantages besides energy savings. The reduced tonnage of the air-conditioning unit allows lower capital outlays and installation costs and reduces the demand for fluorocarbons, which is a recognized environmental hazard. The addition of cool, humid air around the building's periphery also allows for a greater diversity of plants in hot, arid regions.

The partially cooled air mass can be used to best advantage by focusing on the areas of highest heat penetration into the structure. In most buildings, glass areas, such as windows and skylights, are the largest source of heat gain. In some applications, though, the expected size of the air mass or other constraints, such as the need to limit installation costs, may prevent the use of the inventive system such as shown in FIG. 3 for all windows. In such circumstances, it is preferred to apply the cooled air to those glass areas that have the greatest heat gradient, because they are larger or less well-insulated. In structures that do not have such constraints, however, it is possible to cover all significant window areas and have capacity left over for other uses.

Another high-priority use of the cooled body of air in attic 12, which also can improve the efficiency of the overall cooling system, is to cool the compressor unit of air-conditioner 30. In FIG. 2, vent 32 is shaped so as to direct a cone of cooled air at air-conditioner 30. Cooling the compressor unit permits the air-conditioner 30 to operate with greater efficiency, because cooling reduces the "back pressure," allowing the compressor to operate using a larger temperature differential.

The cooled air mass also can be applied to reduce heat infiltration through skylights. The skylight in FIGS. 1 and 2 illustrates one standard type with a clear dome 34 mounted on the roof and a clear sheet 36 replacing part of the attic floor. The side walls inside attic 12 often used in standard skylight designs can be omitted in the inventive system, because the cool air in attic 12 can remove the heat passing through dome 34 while permitting the light to proceed through sheet 36. Because evaporative cooling systems operate with high air volumes, heat buildup from the skylight is minimized.

The cooled air mass also can be applied to reduce heat infiltration through outside entrances such as doors. In FIGS. 1 and 2, for example, vent 38 is positioned to create a curtain of air just in front of door 40. The curtain of air substantially reduces heat infiltration when door 40 is opened, and has the collateral advantage of blocking entry by most flying insects.

In a preferred embodiment, motion detector 42 (perhaps on both sides of the door) can sense the approach of a person and issue a signal causing the activation of airflow through vent 38. Other sensing devices can be used in place of motion detector 42, such as heat detectors, sound detectors, contact detectors (perhaps connected to the doorknob), or other optical sensors. Any other suitable means for indicating that door 40 is opening or about to be opened can be also used, such as electro-mechanical switches activated by the doorknob or doorbell, a person stepping on a doormat, or door 40 itself beginning to open, such as a switch that is triggered by the loss of contact across a simple contact switch mounted on the door 40 and frame of door 40. Activation of the sensor can activate the airflow for a predetermined or adjustable period of time, or else the sensor, or a second sensor such as the above-described contact switch, can be utilized to detect when door 40 is closed. Such sensors can be connected to, or shared with, an alarm system for the structure.

An advantage of the preferred embodiment is that the curtain of cooled air is not activated except when door 40 is opened. That permits conservation of the cooled air mass except when it is needed the most, because doors are typically not subject to high heat-gain unless they are open.

Yet another application for the cooled air mass is areas of the structure that are enclosed or partially enclosed but not typically air-conditioned, such as garages, workrooms, storage rooms, utility rooms, glassed-in porches, and the like. FIG. 1 illustrates one such application, in which garage 44 is cooled by air passing through duct or vent 46. Areas such as garage 44 are often immediately adjacent to the air-conditioned interior of the structure, and the insulation in and around the doors or walls dividing the two areas is often inadequate. In addition, such areas are often subject to heat build-up, making them subject to the same type of problem to which attics are subject. Application of the cooled air to such portions of the structure reduces the infiltration of heat through those areas and also provides added comfort for occupants of the structure as they pass through or spend time in those areas such as garage 44.

Another option for using the cooled air mass is for "on demand" cooling of exterior work and recreational areas, such as patios, porches, and pool decks in residential structures; and walkways, courtyards, and plazas, in commercial structures. In FIG. 2, fan 52 is positioned to blow air onto patio 54. The occupant can control fan 52 with switch or other control 56. The system has significant advantages over present systems for evaporatively cooling exterior areas. The most common system in use today includes misting devices but that system suffers from the problem of excessive moisture or dripping. Because evaporative cooling in the inventive system is done at evaporative cooler 10 and inside attic 12, rather than on patio 54 itself, there is no excessive moisture or dripping possible.

If the capacity of the evaporative cooler 10 is great enough, it is possible to vent evaporatively cooled air into the interior of the structure through one or more vents and associated ducts, such as standard air-conditioning duct 48 in FIG. 2. After passing through the structure, the cooler air (which will have picked up some heat in the course of cooling the interior of the structure) can be passed into attic 12 through up-duct 47, after which the partially cooled air can be applied as stated elsewhere in this patent. Damper 49 can open or close duct 48, thereby controlling the application of cooled air to the interior of the structure. Duct 47 can also be fitted with a similar damper. Those dampers, including damper 49 of FIG. 2 on duct 48, are preferably electro-mechanically coupled to a controller 50. Although controller 50 is shown in FIG. 2 as located in the interior of the structure, it may be placed in another suitable location.

In a preferred embodiment, controller 50 is also electronically coupled to at least one sensor 51, such as a simple thermometer, or a wet-bulb thermometer located in the attic and having an exterior probe, which is useful in measuring exterior temperature and humidity. Sensors 51 provide feedback to controller 50 for automatic operation of vents or ducts 48 leading to the interior of the structure. Controller 50 can be programmed to determine whether the weather conditions make it more suitable to use evaporative cooling or air-conditioning to cool the interior of the structure, taking into account efficiency and comfort, and to alter dampers 49 on duct 48 and the damper on up-duct 47 automatically, depending on the conclusion reached by the program.

In an even more integrated system, controller 50 can have electronic leads to air-conditioner 30 and evaporative cooler 10, allowing it to alter the level of operation of those devices to implement the selected mode of operation. Such automated feedback permits further reduction in energy usage by taking advantage of evaporative cooler 10 when conditions permit. Evaporative coolers typically provide equivalent cooling power for about 20-25% of the cost of air-conditioners, but they cannot be used effectively in certain conditions, notably when the humidity rises about a certain level. Even on humid days, though, there are often certain periods of time during which the relative humidity is low enough to make operation of the evaporative cooler practical.

The preferred sensing system permits utilization of evaporative cooler 10 for interior cooling during those times when its operation would be economical and the cool air it outputs would feel comfortable to the inhabitants, even if the weather switches quickly. During other times, controller 50 would close vents or ducts 48 to evaporatively cooled air, and would operate evaporative cooler 10 only sufficiently to create a cooled air mass in attic 12 that is useful to assist air-conditioning unit 30 in the ways discussed above.

Controller 50 can select, therefore, among various modes of operation: (1) In hot, moderately humid weather, it may use evaporative cooler 10 only for exterior uses and rely on air-conditioner 30 to cool the interior; (2) in hot, dry weather, it may apply air cooled by evaporative cooler 10 to parts of the interior but use air-conditioner 30 to provide additional cooling power in other areas; (3) in moderately warm but extremely humid weather, it may shut off evaporative cooler 10 entirely, because it is ineffective or inefficient; (4) in hot, dry weather, it may shut off air-conditioner 30 entirely, relying on evaporative cooler 10 to cool the interior by itself; and (5) in cooler weather, it may shut off the entire system. Controller 50 can be pre-programmed to choose among those modes of operation depending on the weather conditions sensed and the thermostat setting selected by the occupant.

Any of the possible systems for using the cooled body of air in attic 12 can be automatically controlled by hooking up the vent or duct associated with that use to controller 50. For example, in extremely hot weather, when the system is working near its capacity, it may be desirable to program controller 50 to shut down vent 46 cooling garage 44 or fan 52 cooling patio 54, or cycle them for operation only part of the time, sacrificing those benefits to retain reasonable efficiency. As another example, it may be desirable to close vent 32, which directs cool air at the compressor of air-conditioner 30, when air-conditioner 30 is shut down, or at least a short period of time thereafter. Also, it may be desirable to reduce or eliminate the air flow through exterior vents 16 or 38 if evaporative cooler 10 is being used to cool the interior of the structure.

An alternative, low-cost method of activating the flow of cool air into garage 44 is to use an exhaust fan 45 having a temperature sensor that activates the fan when the temperature exceeds a preset level. When exhaust fan 45 operates, the pressure in the garage will drop, pulling open normally closed vent 46, which can, for example, be spring-loaded. That system permits activation of the garage-cooling option when the temperature increases, without the need for sophisticated controls such as controller 50.

In the preferred embodiment illustrated in FIGS. 1–3, some degree of manual control of elements of the system is also possible by the use of simple manual dampers. For example, FIG. 3 illustrates manual damper 58 for closing vent 16 above window 22. Such dampers can be used, for example, to close down the system during the winter.

The inventive system can be modified for use as a heating, rather than a cooling, system. Passive solar heating techniques, such as those illustrated in FIG. 1 by the south-facing attic windows 60 having an overhang, permit heating of the body of air in an attic 12, particularly during winter afternoons. The heated body of air can then be applied to an interior heat sink, such as concrete wall 62 in FIGS. 1 and 2 or a heavy pole or concrete slab, for later use as a source of radiant heat. Alternatively, the heated air mass can be used to create curtains of heated air around the perimeter of the structure, in any of the ways detailed above. Another modification to the system to permit more effective operation in cool weather can include adjustments for the fact that hot air rises while cool air fails, such as the placement of alternative "winter vents" at the lower part of windows or other areas of high heat gain, or the addition of fans or blowers to force the hot air downward. Also, the system can use another space in the lower portion of the structure, such as a basement, to store the heated body of air. It would be particularly useful to apply the heated air to the coldest areas of the structure, which might be, for example, glass windows on the north face of the structure.

Thus, it is understood by those skilled in the art that numerous alternate forms and embodiments of the invention can be devised without departing from its spirit and scope.

I claim:

1. A temperature-control system for a structure comprising:
    (a) first cooling means for applying evaporatively cooled air to a select, enclosed chamber inside a structure;
    (b) second cooling means for cooling air in areas inside the structure other than the select chamber; and
    (c) venting means including an outlet oriented to direct evaporatively cooled air from the select, enclosed chamber in at least one of the following directions;
        i) into a flat, partially enclosed volume adjoining the outside of a window in an exterior wall of the structure; and
        ii) into a select, otherwise uncooled, area of the structure that is at least partially enclosed.

2. The system of claim 1 in which the second cooling means comprises at least one air-conditioning unit.

3. The system of claim 1 further comprising fan means for pulling air into the select, enclosed chamber of the structure.

4. The system of claim 1 wherein the outlet is oriented to pass air into a select, partially enclosed volume adjoining areas inside the structure that are cooled by the second cooling means, which volume is separated from said inside areas by materials permitting high heat gain, such that air passing through the outlet reduces the infiltration of heat from outside the structure into the areas inside the structure cooled by the second cooling means.

5. The system of claim 1 wherein the venting means includes at least one outlet oriented to direct evaporatively cooled air into a select, otherwise uncooled, area of the structure that is at least partially enclosed, and wherein said area comprises one of the following:
    (a) an enclosed, uncooled garage; and
    (b) a semi-enclosed patio adjacent to enclosed portions of the structure.

6. The system of claim 1 further comprising means for at least partially obstructing the application of air by the venting means to at least one of said outlets.

7. A temperature-control system for a structure comprising:
    (a) means for evaporatively cooling air;
    (b) means for cooling air in areas inside the structure;
    (c) venting means for applying evaporatively cooled air to and through at least one outlet oriented to direct evaporatively cooled air across an entrance to the structure;
    (d) control means for automatically altering the application of air through the outlet; and
    (e) sensor means, coupled to the control means, for detecting the presence of a moving object proximate to the entrance;
    (f) wherein the control means includes means for applying air through the outlet only when the sensor means detects the presence of a moving object proximate to the entrance.

8. A temperature-control system for a structure comprising:
    (a) at least one evaporative cooling unit having an outlet for expelling cooled air;
    (b) at least one air-conditioning unit having an outlet for expelling cooled air;
    (c) first air ducts leading from the outlet of the evaporative cooling unit to a select, enclosed chamber of a structure just below a roof of the structure;
    (d) second air ducts leading from the outlet of the air-conditioning unit to areas inside the structure other than the select chamber;
    (e) at least one air vent leading from the select, enclosed chamber to at least one area outside the structure; and
    (f) at least one open-sided skylight oriented to allow ambient light to pass through the select chamber, which skylight is comprised of two panels through which light can pass, one placed in the roof of the select chamber and the other placed between the select chamber and an area of the structure to which at least one of the second air ducts leads.

9. The system of claim 8 further comprising at least one solar-powered fan having an air inlet and an air outlet inside the select, enclosed chamber of the structure.

10. The system of claim 8 further comprising at least one damper positioned to at least partially obstruct at least one air vent.

11. A system for altering the temperature of a structure comprising:
    (a) first means for altering the temperature of the interior of a structure;

(b) second means for generating a supply of air of a temperature different from the temperature outside the structure; and (c) third means for channelling a quantity of air generated by the second means through a flat, partially enclosed volume adjoining the outside of a window in an exterior wall of the structure.

12. The system of claim 11 wherein the first means comprises an air-conditioning unit.

13. The system of claim 11 wherein the second means comprises an evaporative cooling unit.

14. The system of claim 11 wherein the second means comprises an exhaust system including ducts and fans suited to move air from the first means to the interior of the structure and then to the third means.

15. The system of claim 11 further comprising means for applying the air generated by the second means to a select, enclosed chamber of the structure, and wherein the third means comprises means for moving the air from the select enclosed chamber into the partially enclosed volume.

16. The system of claim 11 further comprising a shade screen disposed proximate to but not in contact with the window, and wherein the partially enclosed volume comprises a space between the window and the shade screen.

17. The system of claim 11 wherein the window includes a first pane of transparent material, further comprising a second pane of transparent material parallel and adjacent to the exterior surface of the window, and wherein the partially enclosed volume comprises a vented space between the two panes.

18. The system of claim 11 wherein the third means includes a louvered vent with a damper placed adjacent to the outside of the window.

19. A method for altering the temperature of a structure comprising:

(a) using a primary system to alter the temperature of the interior of a structure; and (b) simultaneously generating a supply of air of a temperature different from the temperature outside the structure and channelling said air through a flat, partially enclosed volume adjoining the outside of a window in an exterior wall of the structure.

20. The method of claim 19 wherein (b) comprises using an evaporative cooling unit to lower the temperature of outside air and directing the evaporatively cooled air so that it flows in a flat plane down along the outside of the window and inside a shade screen mounted adjacent to the window.

* * * * *